United States Patent [19]

Yau

[11] Patent Number: 5,145,742
[45] Date of Patent: Sep. 8, 1992

[54] POLYMER PELLET CONFIGURATION FOR SOLID-STATE POLYMERIZATION

[75] Inventor: Cheuk C. Yau, Kingsport, Tenn.

[73] Assignee: Eastman Kodak Company, Rochester, N.Y.

[21] Appl. No.: 563,024

[22] Filed: Aug. 3, 1990

[51] Int. Cl.⁵ ............................................. B32B 5/16
[52] U.S. Cl. ................................... 428/402; 528/272
[58] Field of Search .................... 428/402; 528/272

[56] References Cited

U.S. PATENT DOCUMENTS

| | | | |
|---|---|---|---|
| 3,188,264 | 6/1965 | Holden | 428/357 |
| 3,595,737 | 7/1971 | Perrone et al. | 428/402 |
| 4,064,112 | 12/1977 | Rothe et al. | 260/75 M |
| 4,166,875 | 9/1979 | Bussey, Jr. | 428/402 |
| 4,169,179 | 9/1979 | Bussey, Jr. | 428/402 |
| 4,269,895 | 5/1981 | Borchert et al. | 428/402 |

FOREIGN PATENT DOCUMENTS

| | | |
|---|---|---|
| 0284544 | 9/1988 | European Pat. Off. |
| 0335819 | 10/1989 | European Pat. Off. |
| 0354159 | 2/1990 | European Pat. Off. |

*Primary Examiner*—Paul J. Thibodeau
*Assistant Examiner*—Mark A. Forman
*Attorney, Agent, or Firm*—John F. Stevens; William P. Heath, Jr.

[57] ABSTRACT

Disclosed is a configuration for a polymer pellet having improved reactivity for solid-state polymerization and less tendency to stick during processing with heat. The pellets have a reduced path length for volatiles to travel to the exterior of the pellet, and reduced contact area in a packed condition.

6 Claims, 1 Drawing Sheet

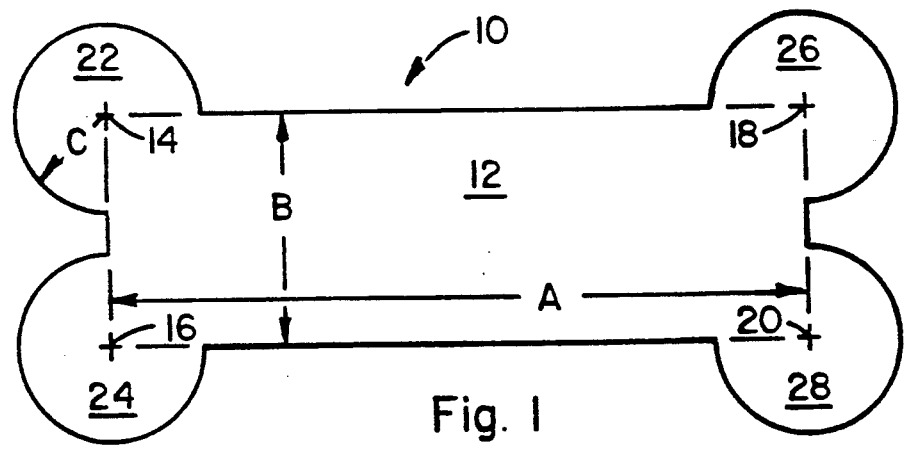
Fig. 1
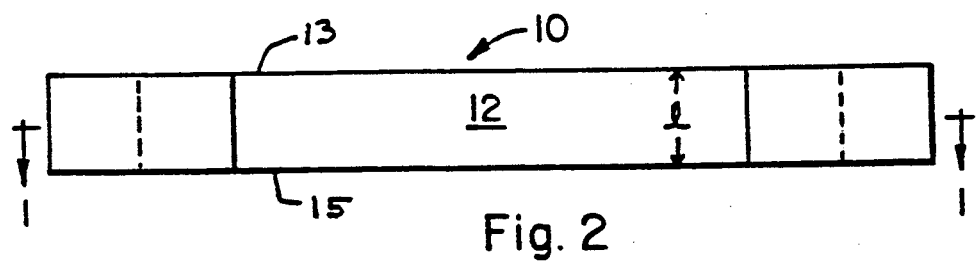
Fig. 2
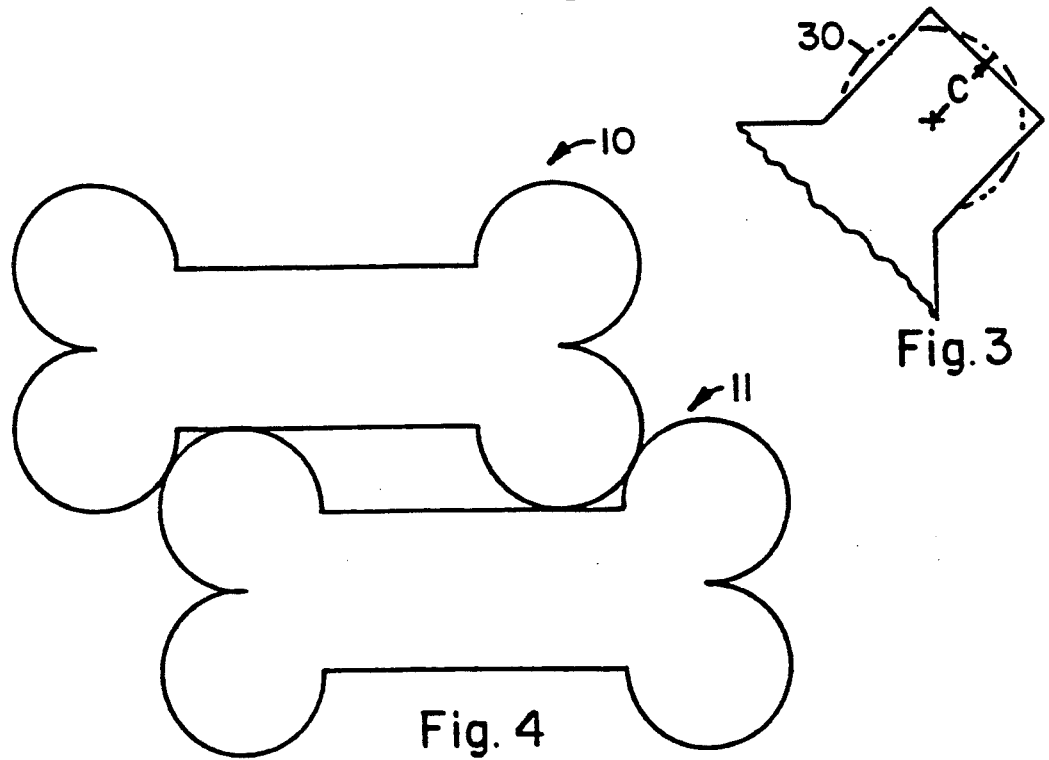
Fig. 3
Fig. 4

POLYMER PELLET CONFIGURATION FOR SOLID-STATE POLYMERIZATION

TECHNICAL FIELD

The present invention relates to polymer pellet configuration for solid-state polymerization. More specifically, the present invention relates to pellets having a short path length for volatiles to be removed from the pellets, and a reduced contact area among pellets to minimize sticking of the pellets undergoing solid-state polymerization in a stationary or moving bed reactor.

It is known that polyethylene terephthalate may be prepared in the molten state by polycondensation accompanied by liberation of ethylene glycol from prepolycondensates in autoclaves of conventional design. Intrinsic viscosities of approximately 0.7 are usually obtained. Intrinsic viscosities as high as 1.00 can be obtained in specifically designed reactors which improve the evaporation of glycol. These prior art processes have the disadvantage that high reaction temperatures, high catalyst concentrations and long reaction time periods are required to achieve high relative viscosities. The inevitable result is an increasing thermal degradation of the melt which manifests itself by a large number of carboxyl end groups and an intensive yellow coloring of the end product. A high percentage of carboxyl end groups leads to strong signs of degradation during the remelting of the polycondensate. The discolorations are particularly undesirable if pellucid polycondensates are needed for the manufacture of, for instance, packing material for foodstuffs or beverages. In addition, simultaneous with the discoloration, elevated concentrations of aldehydes are to be expected in the melt. These properties are particularly undesirable if the end product is used to manufacture beverage bottles. The aldehydes diffuse into the liquid and affect the flavor of these beverages. Further, such aldehyde containing beverages may be considered to be unfit for human consumption by certain regulatory bodies.

In order to avoid these disadvantages, it is known to produce high viscosity polyesters in the solid phase at temperatures below the melting point of these condensates and under an inert gas blanket or vacuum. The drawbacks of this improvement are the large efforts and expenditure required to prevent the granulate from sticking in the course of the solid state polycondensation.

In one attempted solution to solve this sticking problem, the prior art has subjected the granulate to a continuous mechanically produced movement during the solid state polycondensation. Another prior art attempt to solve this stickiness problem is to effect the solid state polycondensation in a fluidized bed in the presence of hot inert gases, such as nitrogen. In order to avoid agglomerations due to stickiness the prior art has also added the so-called anticaking agents to the surface of the polycondensed granulate.

BRIEF DESCRIPTION OF THE DRAWINGS

FIG. 1 is a plan view of a pellet according to the present invention taken along lines 1—1 of FIG. 2;

FIG. 2 is a side view of the pellet shown in FIG. 1;

FIG. 3 is a modification of the pellet according to the present invention; and

FIG. 4 is a view showing two pellets stacked together.

DESCRIPTION OF THE INVENTION

According to the present invention, there is provided a polymer pellet having improved reactivity for solid state polymerization and less tendency to stick during processing with heat, the pellet having opposite faces generally lying in parallel planes, and in cross-section in a plane parallel to the faces the pellet having a generally rectangular central section, the corners thereof protruding into generally rounded lobes, the generally rectangular central section having dimensions A and B wherein the ratio of A to B is about 1.2 to 6 and the ratio of B to the average radius of said lobes is about 0.3 to 5.

The polymer of the pellet according to this invention may be any polymer which is to be polymerized in the solid state. Preferred polymers are polyesters, and in particular poly(ethylene terephthalate) or copolymers thereof.

Typically, polyesters such as poly(ethylene terephthalate) are produced to an intermediate molecular weight of, say 0.4–0.65 in a melt phase, by reacting a dicarboxylic acid or ester with a glycol using suitable catalysts under conventional reaction condition well known in the art. Following melt phase polymerization, the polymer may be subjected to further polymerization in the solid state.

Solid state polymerization is a well known technique for building up molecular weight of a polymer in the solid state. One conventional solid-stating operation takes place in so-called plug flow reactors wherein polymer pellets are introduced into the top of a tall cylindrical vessel and removed from the bottom at the same rate. During the residence times in the reactor, which is commonly in the order of about 8-18 hours, the pellets reach high temperatures, generally about 200–250° C. Molecular weight, as measured by inherent viscosity (I.V.), increases during the time the pellets are in the reactor. Typically, I.V. is increased from a range of about 0.4–0.65 to greater than about 0.7. This process is thoroughly described in U.S. Pat. No. 4,064,112, which is incorporated herein by reference.

Described herein is a design of the cross section of the pellets that incorporates into a pellet of a given weight a reduced path length the volatiles need to travel to the exterior of the pellet to increase solid-state polymerization rate, and reduced contact area among pellets to minimize sticking. This design will also reduce the initial degradation experienced by the pellets during solid-state polymerization because the shorter path allows the moisture content of the pellets to leave in much shorter times and minimize the probability of hydrolytic degradation. The design is shown in FIGS. 1 and 2.

FIG. 1 illustrates pellet 10 having a generally rectangular central section 12 having dimensions A and B. The corners of section 12, 14, 16, 18 and 20 are illustrated in broken lines and protrude into generally rounded lobes 22, 24, 26 and 28, respectively. The lobes are preferably rounded as shown in FIG. 1, but may be of the general shape shown in FIG. 3 wherein the C dimension would be an average distance or radius as indicated in FIG. 3 by broken line 30.

The optimal design has the ratio of B to C of about 1 and the ratio of A to B ranging from about 1.6 to about 4, although the benefit of this design can still be realized when the ratio of B to C varies from about 0.3 to about 5 and the ratio A to B varies from about 1.2 to about 6. When the ratio of B to C is greater than about 1, the cross section of the pellet has the general shape as shown in FIG. 1.

The advantage of the mentioned design can be demonstrated in FIG. 4 wherein the pellets 10 and 11 can be stacked with minimum amount of surface contact. The added space between the two pellets also allows carrier gas to pass through to remove volatiles generated during solid-state polymerization thus increasing the rate of solid-state polymerization.

The pellets of the present invention can be obtained by conventional methods, such as by extruding the polymer melt through a die with the die holes taking the shape as shown in FIG. 1. The extruded polymer can then be chilled to form a solid rod and be cut into pellets of desired lengths. The length (1) of the pellets preferably ranges from about 0.05 to about 0.2 inch but can vary from about 0.03 to about 0.3 inch. The dies can have any number of holes normally ranging from 1 to 100. The opposite upper and lower faces 13 and 15 of pellet 10 are theoretically in generally parallel planes. However, under production conditions, these faces may not be perfectly flat or parallel due to the fact that the cutter is cutting a continuously moving strand of polymer and upon cooling of the pellet there may be slight distortion.

The preferred design is for lobes 22, 24, 26 and 28 to be generally rounded. However, they do not have to be perfectly round and may even resemble portions of a square or rectangle as shown in FIG. 3. In this case, the average diameter, or an arc 30 would be used as the C dimension.

The following example is submitted for a better understanding of this invention.

Pellets with cross sections taking the shape of a circle, square, rectangle and design according to this invention are prepared by extruding poly(ethylene) terephthalate with a 0.76 I.V through a die plate with the corresponding shape of die holes. The die holes have the following dimensions: circular, 5.09 mm in diameter; square, 4.51 ×4.51 mm; rectangular, 2.61 ×7.82 mm; according to invention, A =6.39, B =2.13, C =1.69 mm (dimensions from FIG. 1). The circular, square and rectangular shapes are for comparison. The extruded rods are quenched in chilled water and cut into pellets with an average weight of 0.0177 g/pellet using a rotary cutter. The pellets are crystallized at 180° C. and the solid-state polymerization rates are measured. The results are shown in Table 1.

TABLE 1

Effect of Pellet Shape on Solid-State Polymerization Rate of PET

| Pellet Shape | Solid-State Polymerization Rate (dL/g-h) |
| --- | --- |
| round (comparative) | 0.01410 |
| square (comparative) | 0.01372 |
| rectangle (comparative) | 0.01594 |
| Design shown in FIGS. 1 and 2 | 0.01934 |

I.V. (inherent viscosity) is measured at 25° C. using 0.50 gram of polymer per 100 mL of a solvent consisting of 60% by weight phenol and 40% by weight tetrachloroethane.

The invention has been described in detail with particular reference to preferred embodiments thereof, but it will be understood that variations and modifications can be effected within the spirit and scope of the invention.

I claim:

1. A polymer pellet having improved reactivity for solid-state polymerization, and less tendency to stick during processing with heat, said pellet having opposite faces lying generally in parallel planes, and in cross-section in a plane parallel to said faces, said pellet having a generally rectangular central section, the corners thereof forming lobes which protrude from the rectangular central section in both parallel and perpendicular directions with respect to said generally rectangular central section, said generally rectangular central section having length and width dimensions A and B wherein the ratio of A to B is about 1.2 to 6 and the ratio of B to the average radius of said lobes C is about 0.3 to 5.

2. A polymer pellet according to claim 1 wherein said corners protrude into generally rounded lobes.

3. A polymer pellet according to claim 1 wherein the ratio of A to B is about 1.6 to 4.

4. A polymer pellet according to claim 1 wherein the ratio of B to C is about 0.7 to about 3.

5. A polymer pellet according to claim 1 wherein the length of the pellets is about 0.05 to about 0.2 inch.

6. A polymer pellet according to claim 1 wherein the polymer is a polyester.

* * * * *